Patented Feb. 15, 1944

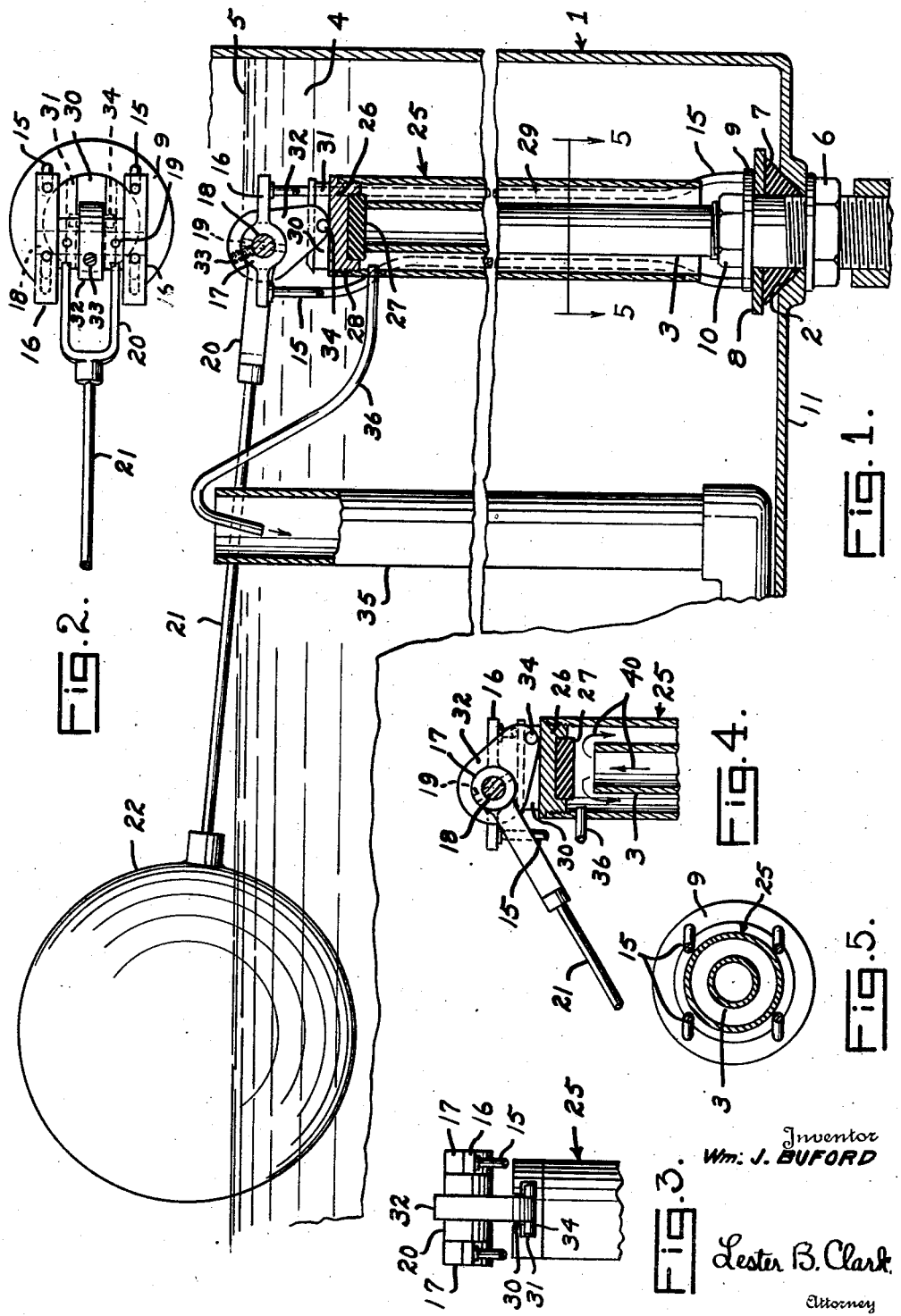

2,341,855

UNITED STATES PATENT OFFICE 2,341,855

BALL COCK VALVE

William J. Buford, Houston, Tex., assignor of ten per cent to L. H. Williams, Houston, Tex.

Application July 14, 1941, Serial No. 402,289

2 Claims. (Cl. 137—104)

This invention relates to a ball cock valve of the type which are commonly used for controlling the admission of water to water closet tanks.

The primary object of the invention is to provide a ball cock valve which is simple in construction and which may be readily installed either as new or replacement equipment.

Another object is to provide a ball cock valve which is so constructed that the water passing therethrough is directed downwardly within the water closet tank.

A further object is to provide a valve of the type disclosed in which the leverage exerted by the float assembly increases as the valve approaches seating position.

Another object is to provide a valve in which the relative position of the ball float and the valve actuating lever may be readily adjusted.

Still another object is to provide a valve which includes a standpipe through which the water enters, an inverted cup shaped valve being movable axially of the standpipe to close the passage therethrough and to direct the entering fluid downwardly about the standpipe.

A more specific object is to provide a valve assembly including a standpipe surrounded by a valve guiding framework which is surmounted by a float actuated valve for controlling the position of the valve which is guided by the framework.

The foregoing objects, together with additional objects, will be more fully apparent from a consideration of the following description considered in connection with the accompanying drawing in which:

Fig. 1 is an elevational view with parts in section to more clearly disclose a construction embodying the invention;

Fig. 2 is a plan view of the valve shown in Fig. 1;

Fig. 3 is a side elevational view of the valve;

Fig. 4 is a sectional elevational view of the upper portion of the valve, similar to that shown in Fig. 1 but showing the valve parts in their relative positions when the valve is open;

Fig. 5 is a sectional view taken on line 5—5 in Fig. 1.

The device of the invention is designed for use in a water closet tank 1 provided with an opening 2 in its bottom to receive a standpipe 3 which is connected to a source of liquid under pressure to provide a quantity of liquid 4 which rises to the level shown at 5 whereupon liquid supply is cut off until a part or all of the liquid is withdrawn from the closet tank 1.

A lower nut 6 on the standpipe 3 engages the exterior of the tank 1. The opening 2 is tapered at its inner end to receive the tapered gasket 7 which is surmounted by a washer 8, a base member 9 and the upper or inner nut 10 so that a fluid tight seal is produced between the standpipe 3 and the bottom 11 of the closet tank 1. It is to be understood that, where the valve of the invention is used as a replacement valve, the standpipe 3 may be part of the original structure to which the valve assembly hereafter described may be secured. On the other hand a replacement where the original structure did not include a standpipe or a new structure using the valve of the invention may be readily effected by clamping the standpipe and valve assembly by means of the nuts 6 and 10 as just indicated.

Attached to the base member 9 are a plurality of guiding and supporting pillars 15 which extend upwardly to a point above the upper end of the standpipe 3. Attached to the upper end of the pairs of pillars 15 are spaced cap members 16 which extend in generally parallel relation. Each of the cap members 16 is provided centrally with an enlargement 17 and such enlargements are provided with aligned openings to receive a transverse shaft 18. This shaft is nonrotatably secured within such opening by means of transverse pins 19.

The shaft 18 also passes through the sides of a yoke 20 to which is attached a float rod 21, the ball float 22 being attached to such rod at its outer end so that the shaft 18 is rocked as the float 22 rises and falls due to changes in the liquid level 5.

Attention is now directed to the novel construction whereby the flow of liquid through the standpipe 3 is controlled. A valve assembly 25 comprises the valve member 26 which carries a gasket 27 on its lower surface for engagement with the upper end of the standpipe 3. Attached to the valve member 26 as by the threads 28, or integral with the valve member, is a cylindrical skirt 29 extending downwardly about the standpipe 3. The valve assembly 25 thus comprises an inverted cap-like construction and the skirt portion 29 thereof is designed to serve the dual function of directing the entering liquid downwardly and also cooperating with the pillars 15 to guide the valve member 26 axially of the standpipe 3. It is to be noted that the pillars 15 are of such configuration and spacing that the valve assembly 25 moves freely among such pillars and is desirably guided thereby.

The valve assembly 25, if a unitary structure, or the valve member 26 is provided with a groove 30 having sidewardly extending undercut portions 31 and such groove receives the outer end of a cam member 32 which is adjustably secured to the shaft 18 intermediate the ends of the yoke 20 as by means of the set screw 33. A transverse pin 34 through the cam 32 enters the undercut portions 31 of the groove 30 and hence rotation of the shaft 18 produces an affirmative upward or downward movement of the valve assembly so that the gasket 27 is lifted from or moved into engagement with the upper end of the standpipe 3.

The water closet tank 1 is provided with an overflow pipe and a refill pipe 36 is attached to and movable with the valve assembly 25 so that liquid admitted through the standpipe 3 is conducted to the overflow pipe 35 to supply a quantity of liquid thereto as is well known in the art.

In the explanation of the mode of operation of the described construction, it is assumed that water is withdrawn from the closet tank 1 whereupon the ball float 22 falls with the receding liquid surface 5. Such movement of the float and the associated rod 21 and yoke 22 rotates the cam 32 and the pin 34 rises and engages the upper surface of the undercut portion 31 of the groove 30 whereby the valve assembly is positively lifted. Thereafter as the liquid rises about the valve, the float assembly rotates the cam 32 in a clockwise direction so that the valve assembly 25 is moved downwardly, guided by the pillars 15, until the gasket 27 engages the upper end of the standpipe 3 to close the passage therethrough. During these operations the entering liquid flows in the path indicated by the arrows 40 (Fig. 4).

It seems apparent from the description and operation of the embodiment of the invention that there is no opportunity for the entering liquid to splash upwardly from the closet tank 1 even though the lid or cover be removed therefrom. Furthermore the downward discharge of liquid directly into the accumulating body of liquid 4 avoids entrainment of air in the liquid together with the noise incident to such entrainment. Hence the construction is such as to provide quiet operation, an additional desired feature of devices of this type.

Attention is also directed to the fact that the effective lever arm of the cam 32 is relatively long during the beginning of the filling operation. As cutoff is approached, however, a line through the axis of the shaft 18 and the pin 34 approaches alignment with the axis of the standpipe 3 and hence a sufficiently large force is exerted to assure closure of the valve.

The desired relation between the float assembly and the cam 32 to determine the liquid level 5 may be readily adjusted by merely loosening the set screw 33 and thereafter tightening the same after the desired relative angular relation of these parts has been obtained.

What is claimed is:

1. A ball cock valve including, a standpipe, a base member clamped to said standpipe, pillars attached to said base member and extending upwardly about the standpipe, a valve assembly including a skirt portion surrounding said standpipe and guided axially thereof by said pillars, cap members mounted on said pillars, a float actuated cam member mounted on said cap member, said cam member being adapted to engage and move the valve assembly axially of the standpipe to close the passage therethrough as the float rises.

2. A flush tank valve assembly including a water inlet pipe adapted to be vertically disposed in the tank, a valve to close the top of said pipe, a skirt depending from the valve enclosing and spaced from the pipe so that the inflow of water discharges downwardly from said skirt, means affixed to the base of the pipe to guide said skirt, and a float actuated means above said valve and connected to said guide means to control said valve, said guide means including rod like members, said last means including cap members carried by said guide means and supporting said float actuating means.

WILLIAM J. BUFORD.